United States Patent [19]

Kratfel

[11] 3,949,967

[45] Apr. 13, 1976

[54] OFF AXIS ROTARY VALVE

[75] Inventor: Edward R. Kratfel, Baltimore, Md.

[73] Assignee: Scientific Research Instruments, Baltimore, Md.

[22] Filed: May 29, 1974

[21] Appl. No.: 474,423

[52] U.S. Cl. ...... 251/314; 137/625.15; 137/625.46; 251/180; 251/208; 251/304; 251/309; 251/364
[51] Int. Cl.² ......................................... F16K 5/04
[58] Field of Search ........... 251/174, 180, 206, 208, 251/314, 161, 304, 352, 309, 310, 364, 368; 137/595, 625.46, 625.18, 625.19, 625.11, 625.15

[56] References Cited
UNITED STATES PATENTS

| | | | |
|---|---|---|---|
| 2,226,169 | 12/1940 | Koehler | 137/625.11 |
| 2,621,886 | 12/1952 | Mueller | 251/310 |
| 2,889,852 | 6/1959 | Dunlap | 137/625.19 |
| 3,085,594 | 8/1963 | Spragens | 137/625.46 |
| 3,214,069 | 10/1965 | Dike | 251/352 |
| 3,319,655 | 5/1967 | Palmer | 137/625.11 |
| 3,536,295 | 10/1970 | Sinkler | 251/368 |

FOREIGN PATENTS OR APPLICATIONS 49,086   4/1889   Germany ............ 251/310

Primary Examiner—William R. Cline
Assistant Examiner—H. Jay Spiegel
Attorney, Agent, or Firm—Cushman, Darby & Cushman

[57] ABSTRACT

An off-axis rotary valve especially suitable for high-temperature vacuum tight fluid switching. A valve cylinder with an off-center opening(s) therein is mounted between two end seals. The end seals engage the circumferential edges of the valve cylinder and perform the functions of axially locating the valve cylinder, sealing the end faces of the cylinder, and providing for communication between the valve cylinder and fluid inlets and outlets. Means are provided for spring-loading the seal faces with the corresponding valve cylinder faces, and means are provided for rotating the valve cylinder.

8 Claims, 3 Drawing Figures

OFF AXIS ROTARY VALVE

BACKGROUND AND SUMMARY OF THE INVENTION

The invention relates to off-axis rotary valves for switching fluid flow in fluid circuits. While it is known to provide seals for the faces of such valves — see U.S. Pat. Nos. 567,200 and 1,141,472 — and while it is known to provide biasing means for the valve faces — see U.S. Pat. Nos. 1,104,944 and 2,034,216 — a means has not been provided that will axially locate the valve cylinder while also adjustably and positively providing sealing of the valve faces and providing communication between the valve cylinder and the valve inlet and valve outlet.

According to the teachings of the present invention, a valve cylinder with an off-center opening(s) therein is mounted between two seal members. The seal members are mounted in end block structures and have openings therein for communication with fluid inlets and outlets, have annular portions thereof for engaging the circumferential edges of the valve cylinder, and have sealing faces for engaging the valve cylinder end faces. An adjustable spring-loaded plate is employed for loading the seals for maintaining sealing engagement between the various seal and valve cylinder faces even during vacuum tight operation. The seals are preferably formed of polytetrafluoroethylene or Vespel so that the valve may be operated at high temperatures.

An object of the present invention is to provide an improved rotary valve.

A further object of the present invention is to provide sealing means for a rotary valve that positively seal the valve faces, axially locate the valve, and provide communication between the valve and the fluid inlets and outlets.

A further object of the present invention is to provide a rotary valve suitable for vacuum tight and high temperature operation.

These and other objects of the invention will become clear upon an inspection of the ensuing detailed description of the invention and the appended claims.

DETAILED DESCRIPTION OF THE INVENTION

Figure 1:
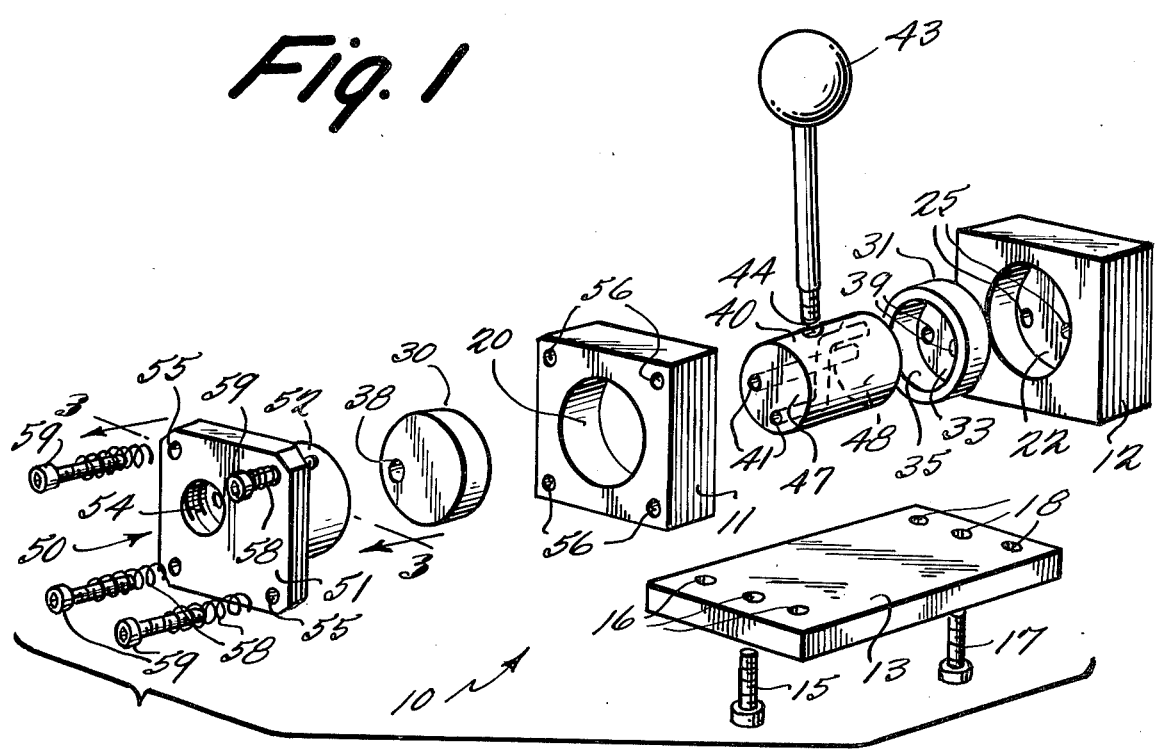
FIG. 1 is an exploded perspective view of the valve according to the teachings of the present invention.

An off-axis rotary valve assembly according to the teachings of the prevent invention is shown generally at 10 in the drawings. The main structural components of the valve assembly are the inlet end support block 11, the outlet end support block 12, and the base plate 13. The inlet end support block 11 is mounted to base plate 13 in any suitable manner, such as by screws 15 extending through holes 16 in base plate 13 and corresponding threaded openings in block 11; outlet end block 12 may be similarly mounted by screws 17 extending through holes 18. The inlet end support block has a large centrally located aperture 20 therein for receiving the inlet seal and the seal loading means, as will be described further. The outlet end block 12 has a centrally located cutout 22 therein for receiving the outlet seal, as will be further described, and has off-center outlet orifices 25 in the end face thereof.

Inlet seal 30 is located within aperture 20 of block 11 while outlet seal 31 is located within cutout 22 in block 12. Mounted between the seals 30, 31 is the valve cylinder 40. As is most clearly shown in FIG. 2, when the valve is assembled end faces 47, 48 of valve cylinder 40 respectively engage faces 32, 33 of seals 30, 31. Annular portions 34, 35 extending respectively from seal faces 32, 33 engage the circumferential edges of the valve cylinder 40. Off-center inlet opening 38 in inlet seal 30 communicates with off-center openings 41 in valve cylinder 40 at various angular positions of the cylinder 40, while off-center outlet openings 39 in outlet seal 31 provide for communication between cylinder openings 41 and outlet orifices 25 in end block 12. A handle 43 threadable into threaded opening 44 in valve cylinder 40 may be used for rotating the valve cylinder.

It will thus be seen that the seals 30, 31 according to the teachings of the present invention provide for communication between valve cylinder 40 and the inlet and outlet, axially locate the valve cylinder 40 via annular portions 34, 35 engaging the circumferential edges of the valve cylinder, and have faces 32, 33 sealing the end faces 47, 48 of the valve cylinder. The seals 30, 31 are preferably made of Vespel or polytetrafluoroethylene so that operation of the valve at temperatures up to 350°C is possible, but other suitable sealing materials may be used.

Figure 2:
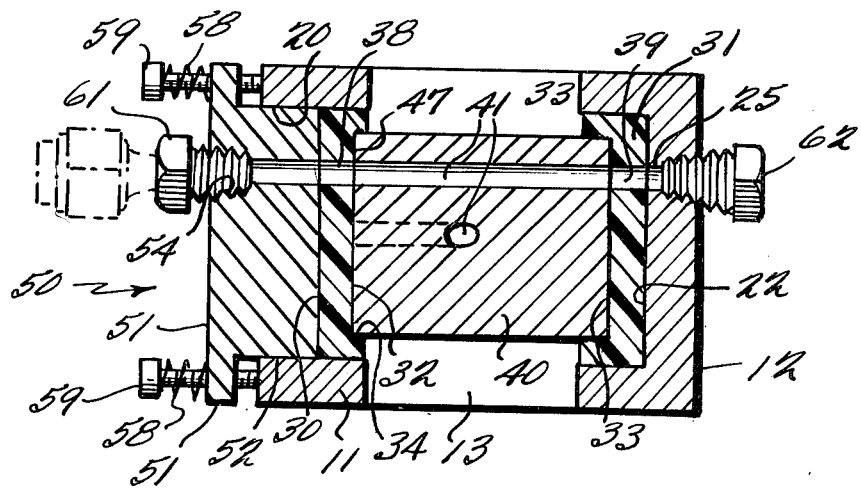
FIG. 2 is a horizontal cross-sectional view looking down on the assembled valve according to the teachings of the present invention taken generally along the axis of the valve cylinder.
Figure 3:
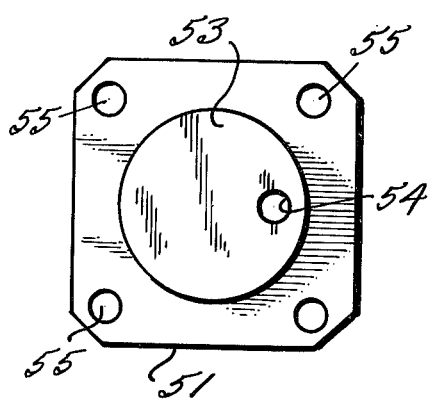
FIG. 3 is an end view of the seal loading plate according to the teachings of the present invention taken along lines 3—3 of FIG. 1.

A means is provided for applying an adjustable compressive seal force for maintaining fluid-tight sealing between the seal faces 32, 47 and 33, 48 respectively. Such a sealing force is especially advantageous for vacuum tight operations. The seal loading force is preferably supplied by a spring-loaded plate, shown generally at 50, having an end portion 51 and a raised cylindrical portion 52. The cylindrical portion 52 is located in aperture 20 in block 11. As seen in FIG. 3, the cylindrical portion 52 has a face 53 thereof that engages inlet seal 30. Pressure is applied to inlet seal 30 by face 53 via screws 59 and springs 58. Each spring 58 engages the plate portion 51 around an aperture 55. A screw 59 extends through each spring 58 (and has the head thereof in engagement with the spring) and through the corresponding aperture 55 into the corresponding threaded opening 56 in inlet block 11. As can be seen in FIG. 2, the plate portion 51 is always spaced from the block 11, thus as the screws 59 are tightened they compress the springs 58 thereby exerting a force on the plate 50 and subsequently the seal 30. Naturally, the more the screws 59 are tightened the more force is exerted on seal 30, and thus the greater the sealing pressure between faces 32, 47 and 33, 48 respectively will be.

The plate 50 has an off-center inlet orifice 54 located therein for communication with inlet opening 38 in seal 30, and subsequently with valve cylinder openings 41. The inlet orifice 54 may be internally threaded to allow attachment of a nipple 61 of a fluid pressure source. A similar nipple 62 may be provided for connection of a hose(s) to the outlet orifices 25.

The various components of the valve assembly according to the teachings of the prevent invention having been described, the operation will now be set forth.

Screws 59 through seal loading plate 50 are tightened to compress springs 58 the desired amount to apply sealing pressure for the sealing faces 32, 47 and 33, 48. A fluid pressure source is hooked up to fluid inlet 54, and an outlet hose(s) to outlets 25. Fluid flowing through inlet orfice 54 will flow through opening 38 in inlet seal 30, and through one of the off-center holes 41 in valve cylinder 40 if one of the holes is in register with the seal opening 38. After flowing through valve cylinder 40, the fluid will flow through the corresponding opening 39 in outlet seal 31, and the further corresponding outlet orifice 25 into the exhaust hose(s). The valve cylinder may be rotated via handle 43 to a position wherein neither of the openings 41 are in communication with inlet seal opening 38, or to either of the positions wherein one of the openings 41 is in communication with seal opening 38.

It is obvious that many modifications of the present invention are possible. For instance; the end support blocks could be attached together by means other than a base plate; the valve cylinder could be rotated by means other than a handle; indexing means could be provided for positivly locating the valve cylinder in its various positions; any number of inlets and outlets could be provided as well as any number of corresponding openings within the valve cylinder for providing communication between the various inlets and outlets (limited only to the extent that since an opening must be provided in a seal for each inlet or outlet opening, the number of openings should not be so great as to prevent the seals from effectively preforming their functions); means other than adjustable screw-pressed coil springs could be utilized for providing the necessary spring loading for the seal faces. Other modifications are also possible, thus the invention is not limited to the prefered disclosed embodiments, but is to be accorded the full scope of the claims so as to embrace any and all equivalent structures and devices.

What I claim is:
1. A valve assembly comprising
   a. means defining a fluid inlet,
   b. means defining a fluid outlet,
   c. a rotatable valve cylinder having an off-center opening therethrough extending from one end face of said cylinder to the other end face, said valve in a first angular position thereof providing communication through said opening between said fluid inlet and said fluid outlet, and in a second angular position thereof not allowing communication through said opening between said fluid inlet and said fluid outlet,
   d. means for rotating said valve cylinder between said first and second angular positions,
   e. sealing means for providing face-to-face sealing for sealing said end faces of said cylinder, for providing face-to-face sealing for sealing said means defining said fluid inlet and said means defining said fluid outlet, for providing communication between said cylinder opening and said inlet and said outlet, and for engaging the circumferential edges of said cylinder thereby axially locating said cylinder, said sealing means comprising two annular sealing members each having a recess for receiving an end of said cylinder, the border of each said recess of said member engaging the corresponding circumferential edge of said cylinder, and at least one off-center aperture in each member for providing communication between said valve cylinder opening and said fluid inlet or said fluid outlet,
   f. means for supporting said sealing means comprising an inlet end block and an outlet end block, each block having an opening therein for receiving said sealing means, and
   g. resilient means for loading said sealing means for providing fluid tight engagement between said sealing means and said valve cylinder faces and between said sealing means and said means defining said fluid inlet and said means defining said fluid outlet.

2. A valve assembly as recited in claim 1 wherein said sealing members are composed of a material selected from the group consisting of polytetrafluoroethylene and Vespel.

3. A valve assembly as recited in claim 1 wherein said resilient means for loading said sealing means comprises a spring loaded plate having an appended portion thereof in engagement with one of said sealing members.

4. A valve assembly as recited in claim 1 wherein said opening in said inlet block comprises an aperture extending completely therethrough and wherein said blocks are rigidly attached together.

5. A valve assembly as recited in claim 4 wherein said loading means comprises a plate having an appended portion thereof extending through said inlet block aperture into engagement with said sealing means received therein.

6. A valve assembly comprising
   a. means defining a fluid inlet,
   b. means defining a fluid outlet,
   c. a rotatable valve cylinder having an off-center opening therethrough extending from one end face of said cylinder to the other end face, said valve in a first angular position thereof providing communication through said opening between said fluid inlet and said fluid outlet, and in a second angular position thereof not allowing communication through said opening between said fluid inlet and said fluid outlet,
   d. means for rotating said valve cylinder between said first and second angular positions,
   e. sealing means for sealing said end faces of said cylinder, for sealing said means defining said fluid inlet and said means defining said fluid outlet, for providing communication between said cylinder opening and said inlet and said outlet, and for engaging the circumferential edges of said cylinder thereby axially locating said cylinder,
   f. means for supporting said sealing means comprising an inlet end block and an outlet end block, each block having an opening therein for receiving said sealing means, and
   g. adjustable means for loading said sealing means for providing fluid tight engagement between said sealing means and said valve cylinder faces and between said sealing means and said means defining said fluid inlet and said means defining said fluid outlet, said means comprising a plate having an appended portion thereof extending through said inlet block aperture into engagement with said sealing means received therein, and a plurality of coil springs in engagement with said loading plate and each having a screw extending therethrough, said screws extending through apertures in said loading plate and into threaded openings in said inlet block whereby threading of said screws into said block adjusts the spring pressure loading said loading plate and thereby the loading being applied to said seal member engaging said loading plate portion.

7. A valve assembly as recited in claim 6 wherein said loading plate includes said means defining said fluid inlet.

8. A valve assembly as recited in claim 6 wherein said outlet end block includes said means defining said fluid outlet.

* * * * *